United States Patent
Nitsche et al.

Patent Number: 5,954,607
Date of Patent: Sep. 21, 1999

[54] TRANSMISSION UNIT AND METHOD FOR OPERATION OF A TRANSMISSION UNIT

[75] Inventors: Martin Nitsche, Gerstetten; Andreas Englisch, Heidenheim, both of Germany

[73] Assignee: Voith Turbo GmbH & Co., KG, Heidenheim, Germany

[21] Appl. No.: 09/125,087

[22] PCT Filed: Nov. 27, 1997

[86] PCT No.: PCT/EP97/06623

§ 371 Date: Oct. 26, 1998

§ 102(e) Date: Oct. 26, 1998

[87] PCT Pub. No.: WO98/25053

PCT Pub. Date: Jun. 11, 1998

[30] Foreign Application Priority Data

Dec. 4, 1996 [DE] Germany ............... P196 50 339
Jan. 15, 1997 [DE] Germany ............... P297 00 605 U

[51] Int. Cl.⁶ ............................................. F16H 45/00
[52] U.S. Cl. ..................................... 475/42; 475/49
[58] Field of Search ............................. 475/42, 49, 50, 475/61, 64

[56] References Cited

U.S. PATENT DOCUMENTS

| | | | |
|---|---|---|---|
| 4,413,535 | 11/1983 | Hobbs | 74/688 |
| 4,583,426 | 4/1986 | Chassagnette et al. | 74/733 |

FOREIGN PATENT DOCUMENTS

| | | | |
|---|---|---|---|
| 160 832 | 6/1933 | Germany . | |
| 2 018 374 | 10/1979 | United Kingdom | B60K 41/26 |

OTHER PUBLICATIONS

"Voith—Hydrodynamic in Drive Technology", Krauskopf Engineering Digest, 1997.

*Primary Examiner*—Dirk Wright
*Attorney, Agent, or Firm*—Taylor & Associates, P.C.

[57] ABSTRACT

A transmission unit for drive units is used to achieve at least two operational states: a first operational state for the transmission of power with at least two gear steps, and a second operational state for braking. The transmission unit includes an input shaft and an output shaft, a hydraulic transmission part and a mechanical transmission part. The two transmission parts are arranged in series. The hydraulic part includes at least two blade wheels in the form of a primary blade wheel and a secondary blade wheel, which together form at least one toroid operating space which can be filled with operating fluid. The two blade wheels are coupled to the input shaft of the transmission unit and to the mechanical part via at least part of the first operational state in such a way that power is transmitted from the primary blade wheel to the mechanical part via the secondary blade wheel. Elements PK and PB are included which, in a second operational state, hold and support the first of the two blade wheels in relation to the fixed transmission parts and connect the other, secondary blade wheel with the second mechanical transmission part.

65 Claims, 7 Drawing Sheets

Fig.2

|  | K1 | K2 | K3 | ÜK | PK | B1 | B2 | B3 | PB |
|---|---|---|---|---|---|---|---|---|---|
| 1. Gang | X |  |  |  | X |  | X | X |  |
| 2. Gang | X | X |  | (X) | X | X |  | X |  |
| 3. Gang | X | X | X | X | X |  |  | X |  |
| 4. Gang | X |  | X | X | X |  | X |  |  |
| 5. Gang | X | X | X | X | X | X |  |  |  |
| 6. Gang | X | X | X | X |  |  |  |  |  |
| R-Gänge |  |  |  |  |  |  |  |  |  |
| R 1 |  | X |  |  | X |  | X | X |  |
| R 2 |  | X | X |  | X |  | X |  |  |
| Bremsstufen |  |  |  |  |  |  |  |  |  |
| B-Stufe 1 | X |  | X | (X) |  |  | X | X | X |
| B-Stufe 2 | X |  |  | (X) |  |  | X | X | X |

ÜK Überbrückungskupplung   PK Pumpenkupplung   PB Pumpenbremse

|  | PB | PK | ÜK | 46 | 47 |
|---|---|---|---|---|---|
| hydr. Fahren V | 0 | 1 | 0 | 1 | 0 |
| mech. Fahren | 0 | 0 | 1 | 0 | 0 |
| Bremsen | 1 | 0 | 1 | 0 | 1 |
| hydr. Fahren R | 0 | 1 | 0 | 0 | 1 |

TRANSMISSION UNIT AND METHOD FOR OPERATION OF A TRANSMISSION UNIT

BACKGROUND OF THE INVENTION

1. Field of the Invention

This invention concerns a transmission unit and a method to drive a transmission unit.

2. Description of the Related Art

Transmissions which are equipped with both a mechanical transmission unit and a hydrodynamic transmission unit are well-known in numerous design variations. The hydrodynamic component of the transmission is typically designed to serve as a hydrodynamic coupling or hydrodynamic torque converter. These components, sometimes referred to as fluid drives, include an impeller and a turbine which together form at least one toroid-shaped operating zone. This space can be filled with an operating fluid, and this fluid is accelerated by the turbine and decelerated by the compressor. The resultant torque generation is essentially the result of inertia forces generated by the change in velocity of the fluid. The transmitted power is the product of the change in swirl (rotating momentum) of the fluid and the angular velocity. In addition to the compressor and turbine, a hydrodynamic torque converter also includes a "reactionary" component which is commonly referred to as stator. This stator is capable of absorbing torque. Since the sum of the moment forces in this circuitry has to equal zero, the torque of the turbine can, depending on the size and rotational direction of the stator torque, be larger, the same, or smaller than the torque induced by the compressor. In this manner, it is possible with the additional arrangement of only an impeller and a turbine, which is also referred to as hydrodynamic coupling, to substantially vary the rotational speed range and the torque of the turbine in relation to the impeller.

The transmitting of power hydrodynamically offers the advantages of being able to transmit significant power levels at high efficiency, low wear rates, and the use of transmission components that are comparatively small. Furthermore, these components are primarily used during run-up or during the initial acceleration phase of a vehicle that utilizes a power-generating device, as well as a power-consuming device. In transmission designs that are equipped with a hydrodynamic coupling as well as a gearbox, the hydrodynamic coupling serves the function of a "start-up" clutch. The torque or power transmission occurs consequently via the hydrodynamic unit only in first gear, usually during the initial acceleration phase. In other gears, the hydrodynamic unit is excluded from transmitting power. In addition, the transmission unit can include another fluid dynamic device such as a hydrodynamic retarder whose purpose it is to provide braking. This retarder can be an integral part of the transmission or can be an attachment to the transmission. The same task can also be performed by hydrodynamic torque converters which can work, in the lower gears, in a power-sharing mode together with the mechanical gears. Thereby, the hydrodynamic torque converter is usually used during the initial acceleration phase as a "start-up" or acceleration device. In the remaining gears, the power will be transmitted on a purely mechanical basis by bypassing the hydrodynamic converter. In the lower gears, the power will be transmitted via the hydrodynamic torque converter and the mechanical gearing of the transmission.

The present developments in the automobile industry are partially characterized by conflicting trends. In addition to the trends for more design space, more comfort and improved vehicle acceleration and deceleration behavior for the purpose of improved safety for all vehicles, the aspect of environmental protection increases in significance. One possibility of lowering $CO_2$ emissions that are emitted by automobiles is the improvement of the energy conversion process (mechanical efficiency) of the drive train between the engine and the power consumer. Furthermore, the trend is to use smaller engines with smaller displacements which translates into lower torque and higher rated engine speeds. These are the requirements by which vehicle transmissions will be judged. The fundamental criterion in the assessment of the quality and character of the transmission are thereby determined by:

the driveability performance as determined by the performance range of the torque converter;

the number of gears and gear ratios; and the fuel consumption as affected by the layout of the drive ratio in the highest gear as well as the efficiency of the transmission.

It is therefore desirable for transmissions to achieve optimum efficiency and torque converter range which, at a given gear selection, maximizes the use of the engine operating range. This, in essence, allows operation along the optimum fuel consumption curve. Above all, it is then possible to decrease fuel consumption, harmful exhaust emissions and aggregate noise emissions by increasing the gear ratio separation in suitable stages.

The automatic transmissions that are on the market today fulfill these stated requirements by and large very well. However, in order to effectively operate the internal combustion engine within the minimum fuel consumption operating area, in combination with lowest exhaust emissions, a sufficient number of gear ratios are required such that 5 and 6 speed transmissions are no longer rarities in the automobile industry. This has the consequence of an increase in the number of transmission related componentry. Additional building blocks are required for the achievement of additional functions or tasks such as the generation of braking torque, for example. As a rule, transmission configurations that include a hydrodynamic coupling or hydrodynamic torque converter, as well as a mechanical transmission unit, often also use a hydrodynamic retarder. In this case, solutions are to be devised to reduce windage losses during idling of the impeller since a retarder that has been fully emptied always develops a residual amount of torque as a result of frictional bearing losses and change in swirl (rotating momentum) of the air surrounding the components. The braking torque generated by this residual torque is very small. However, it could have a very negative effect at elevated rotational speeds and can lead to an unacceptable increase in the temperature of the retarder. To lower the losses associated with windage (aerodynamic blade pass losses), a series of solutions are already known. One of the solutions includes the use of stator bolts as well as the evacuation of the hydraulic circuit. These solutions, however, are very extravagant in their application and require additional design space and, therefore, a larger retarder. There are, however, known transmission configurations with hydrodynamic torque converters that use this device for the purpose of generating braking torque.

Based on the trends to engines with smaller displacements, which tend to require an ever smaller attachment diameter, it becomes increasingly difficult to apply hydrodynamic converters with small outline dimensions which are capable of transmitting the available engine torque at low rotational speeds. Specifically, drawbacks arise such as power transmission capability being acceptable only at elevated speeds. Since, however, the initial acceleration phase requires torque and not power, there are additional losses in power as a result of the elevated rotational speeds which are, in turn, reflected by an increase in fuel consumption. The associated increase in noise emissions places a burden on the environment. During braking of a vehicle with a typical drive line design, the internal combustion engine remains connected to the vehicle or to the output shaft of the transmission and, therefore, causes unnecessary noise emissions due to resultant high shaft speeds.

There exist many variations of transmission design. This is due to the required total gear ratio separation and the required shapes of the blading of the individual elements dictated by the numerous applications to internal combustion engines.

SUMMARY OF THE INVENTION

The present invention improves the transmission as applied in a drive line such that the disadvantages are avoided to a large degree. Specifically, it is desirable to achieve universal application capability which is characterized by the generation of sufficient drive and braking torques. The matching to a multitude of engines without parts proliferation is also desirable, as well as a large gear ratio separation. Furthermore, it is desirable to achieve improved compliance to environmental requirements, especially as they apply to noise emissions during initial acceleration phase. The number of components are held to a minimum.

In addition, one transmission configuration with a minimum of design variations is capable of covering a broad range of applications.

A transmission unit for drive units that is capable of at least two operating modes, one to transmit power with at least two gearing steps, and a second operating mode for braking requires, at a minimum, a hydraulic transmission unit and a mechanical transmission unit that is arranged in line with the hydraulic component. The hydraulic transmission unit includes, at a minimum, one primary impeller and one secondary impeller. Together, they form a toroid-shaped and fluid-filled operating zone. The attachment of the two impellers onto the transmission input shaft and the mechanical transmission unit is done such that power of the primary impeller is transmitted to the secondary impeller onto the mechanical component of the transmission, at least over a partial operating range of the first operating mode. In accordance with the invention, there are devices provided which, during operation in the second mode, lock and support one of the two impellers against the stationary transmission components and lock the other impeller against the mechanical transmission unit. That means that a transmission unit that is applied as an automatic transmission is modified such that the functions of a hydrodynamic coupling and a hydrodynamic retarder are performed by a single subassembly, a hydrodynamic transmission unit.

In order to achieve the functions of a hydrodynamic retarder, there are two basic concepts possible:

1) Assignment of the function of the stator to the primary impeller by fixing it relative to the stationary transmission components and the assignment of the function of the retarder braking rotor to the secondary impeller.

2) Assignment of the function of the stator to the secondary impeller by fixing it relative to the stationary transmission components and the assignment of the function of the retarder braking rotor to the primary impeller.

The impeller, serving the function of a retarder braking rotor, is in both cases attached to the transmission output shaft. Accordingly, the attachment alternatives between the hydraulic to the mechanical transmission components are to be considered in the design of the transmission unit. The hydrodynamic transmission unit is fundamentally a hydrodynamic coupling which connects the input shaft with the output shaft directly during the initial acceleration phase. In all other gear selections, the coupling can be used for the generation of braking torque by locking one of the impellers to the transmission housing and connecting the other impeller to the mechanical part of the transmission. This offers the advantage of saving design room and lowering manufacturing costs.

In order to realize the second operating mode, in accordance to the first basic concept, the secondary impeller is locked against the mechanical part of the transmission. There are devices provided which allow the primary impeller, during the first operating mode (which serves to transmit power and when applied to vehicles is considered a "driving" mode), to be attached or connected directly to the transmission input shaft. Furthermore, there are second devices provided that allow the direct connection of the secondary impeller to the transmission input shaft for the remaining gears of the first operating mode. Thereby, The first operating mode includes the forward and reverse gears.

The connection of the primary impeller to the transmission input shaft is accomplished, for example, with a so-called primary impeller clutch. The locking of the primary impeller relative to the non-moving or stationary transmission components, especially the transmission housing, is accomplished mostly with a brake device. Furthermore, the transmission will be equipped with a so-called "bypass coupling" which connects the transmission input shaft directly with the secondary impeller by bypassing the primary impeller. This has the advantage that when applying fluid to the hydraulic transmission unit in the first operating mode (mostly only in first gear which is also called "acceleration" gear), the primary impeller performs the function of an impeller of a hydrodynamic coupling. The primary impeller is driven and the torque is transferred due to the fluid forces generated by the rotation of the primary impeller, onto the secondary impeller which has now performed the function of the turbine. In the remaining gears in the first operating mode (that is, the forward gears and the reverse gears) the hydrodynamic transmission unit remains substantially without fluid. The secondary impeller is then driven directly through the bypass clutch by the transmission input shaft. When the primary impeller is fully decoupled from the transmission input shaft, a situation is created during this mode of operation that allows air to be agitated in the toroid-shaped space (operating zone) formed within the area between the impellers. This air is instead of what would otherwise be operating fluid in filled condition. For this purpose, it is planned that the primary impeller during the elevated gears in the first operating mode rotates at the same rotational speed as the secondary impeller. The power required to drive the primary impeller, which is derived from the output shaft, is relatively small and simply depends on the weight of the primary impeller that the output shaft has to drag along. The idle losses are thereby substantially reduced.

In the second operating mode (braking), the hydraulic transmission unit, which is employed as a coupling during the first operating mode, is operated as a hydrodynamic retarder. Thereby, the primary impeller takes on the function of the stator wheel by locking it to non-moving, stationary transmission components. To realize a change in functions between power transmission and braking, according to the first basic concept, there are, in principle, two alternatives (scenarios) envisioned. The secondary impeller is driven either:

1.1. via the output shaft at the same rotational direction with possible connection between the mechanical transmission componentry and the transmission input shaft; or 1.2. from the transmission output shaft with interrupted connection between the secondary impeller and the transmission input shaft, or the drive shaft that is coupled to the transmission input shaft with reversed rotational direction in relation to the direction encountered during the initial acceleration phase.

The secondary impeller performs the function of the retarder braking rotor. In this operating condition, the hydraulic transmission unit (also called the hydraulic transmission element) is at least partially filled with operating fluid. This fluid, as a result of the rotation of the secondary impeller, is churned in the area formed between the primary and secondary impellers and is subsequently slowed down on the fixed blading of the primary impeller. Devices are provided which lock the primary impeller relative to the non-moving, stationary transmission components.

With the first-mentioned alternative changing the functions), the hydrodynamic transmission unit is filled with operating fluid in order to generate the braking torque. The secondary impeller remains connected to the output shaft via the engaged gear selection. Due to the motoring action on the part of the output shaft of the transmission, the secondary impeller is motored by same, without change in direction of rotation relative to the direction of rotation that is encountered during start-up.

The blading of both impellers should be slanted. This means the blading vis-à-vis the separation plane that is formed between the primary and the secondary impeller are positioned at an angle. The blade direction, which is the slant of the individual blades relative to the respective blade root, is selected such that in the first operating mode, especially during initial acceleration phase, the operating fluid, after having passed through the area between two neighboring blades of the primary impeller (driven by the transmission input shaft), is subsequently deflected on the backsides of the secondary impeller blades. This forms a closed fluid circuit between the primary and secondary impeller, and thus torque is transmitted. The term "blade backside" refers to the blading in direction of rotation. This working principle of the primary impeller relative to the secondary impeller is referred to as "piercing". Also during the operating mode "braking", the hydrodynamic transmission unit is filled with operating fluid. The selected gear is, per the first-mentioned alternative, retained in the mechanical transmission unit. The primary impeller is locked, and the secondary impeller is driven, in the same rotational direction, by the vehicle, or more specifically, the transmission output shaft. Both impellers change their function. Now, the secondary impeller is the driven wheel in the same direction as the primary impeller during the initial acceleration phase. The primary impeller is locked and, henceforth, performs the function of a stator in a hydrodynamic retarder. Due to the slanted blading, only a part of the fluid energy that was generated as a result of the secondary impeller rotation can be converted into braking power and into thermal energy. The working principle of the secondary impeller in this operating mode can be characterized as "running away" relative to the stator wheel which is functioning as the primary impeller. This kind of realization of generating braking power through changes in functions of the two impellers, the primary and secondary impellers, can be performed without additional expense or effort and can be achieved from the selected gear. Specifically, only devices that allow a locking of the primary impeller are necessary. Such a design is therefore very cost effective.

In order to reduce noise generation during the operating condition of "braking", the power source is disconnected from the secondary impeller. This means, for example, that the connection between the secondary impeller and the transmission input shaft, or the connection between the transmission and the power source is severed.

The reactionary torque generated by the slanted blading on the primary impeller which leads to the braking of the output shaft (connected to the primary impeller via the mechanical part of the transmission) is, however, smaller than one would observe if the secondary impeller operates in a "piercing" mode of operation relative to the primary impeller. Therefore, for the generation of braking torque, the rotational direction of the secondary impeller, which functions as a braking rotor in the operating mode "braking", will be reversed. This second alternative is realized by activation of at least one reversal unit which can be assigned to the individual gears, or by the activation of gears that realize a direction of rotation of the secondary impeller which is opposed to the normal operation, i.e. a reverse mode. Based on the slanted blading design, a closed hydraulic circuit develops between the secondary impeller functioning as retarder braking rotor under these circumstances and the primary impeller functioning as stator wheel. The driven secondary impeller converts the induced mechanical energy, when the hydraulic circuit is filled, into fluid energy which is converted into thermal energy on the fixed primary impeller. This preferred alternative of changing the functionality of the hydrodynamic transmission offers the advantage of stepping up the rotational speed of the secondary impeller. In conjunction with the requirements imposed on the hydrodynamic design component and the very large transmission capabilities derived from the initial acceleration phase, a very large speed range is developed. This speed range, however, can be covered during braking by changing the degree of filling. The control of the brake torque can be performed just as on a conventional secondary retarder which is integrated or attached to the transmission, i.e., by changing the degree of filling. Relative to the alternatives available to change the degree of filling specifically, reference is made to the publication "Hydrodynamic in the Automotive Science", Krauskopf-Verlag 1987. The disclosure of this literature with regards to the change in degree of filling of the hydrodynamic braking devices is incorporated by reference herein.

If the secondary impeller, which is the turbine in the braking mode, has been changed in regards to its rotational direction such that a "piercing" mode of operation exists, the mechanical components of the transmission remain unaffected in comparison with known transmission configurations. Only the turbine and the secondary impeller undergo changes in their rotational speeds. The gear ratio to the transmission output shaft can be selected through an appropriate choice of ring gear of the output planetary gear set independent of the individual gear ratios that are selected during first operating mode. During the braking phase, no shifts can occur. That means that within the range of maximum velocity to the lowest velocity, the brake torque is controlled continuously variably by changing the degree of filling just as on a secondary retarder. This has the advantage, without additional speed excursions, of applying braking down to lower vehicle speeds than would otherwise be possible. Consequently, this generates a broader braking range with this non-wearing hydrodynamic brake. The secondary impeller is disconnected from the engine during generation of break torque through the rotational speed change of the secondary impeller. To accomplish this, the "bypass" clutch is released on transmissions such as described above. It is, however, also possible to leave the connection between the transmission input shaft and the mechanical component of the transmission intact and only disconnect the transmission input shaft from the engine.

The attachment of the primary impeller onto the transmission input shaft can be accomplished, for example, with a so-called primary impeller clutch. The locking of the primary impeller relative to the non-moving or stationary transmission components can be accomplished by a brake device. Furthermore, the transmission also includes a so-called bypass clutch which connects the transmission input shaft directly with the secondary impeller by bypassing the primary impeller. This achieves the effect of the primary impeller taking on the function of an impeller in a typical hydrodynamic coupling. This, however, mostly occurs only when filling the hydrodynamic transmission unit during the first operating mode and only in first gear, which is also called the "initial acceleration phase" gear. The primary impeller is driven and the torque (generated by the fluid forces/torques caused by the primary impeller rotation) is transmitted to the secondary impeller now functioning as a turbine. In the remaining gears during the first operating mode, that is, all forward gears and also partially the reverse gear, the hydrodynamic transmission unit remains essentially devoid of fluid. The secondary impeller is then driven directly via the bypass clutch by the transmission input shaft. When the primary impeller is fully decoupled from the transmission input shaft, a situation is created during this mode of operation that allows air to be agitated in the toroid-shaped operating zone formed by the area between the impellers. This air is instead of what would otherwise be operating fluid in filled condition. For this purpose, it is preferred that the primary impeller operates at the same rotational speed as the secondary impeller for the subsequent gears in the first operating mode. The power required to drive the primary impeller, which is derived from the output shaft, is relatively small and simply depends upon the weight of the primary impeller that it has to drag along. The idle losses are thereby substantially reduced.

In a transmission unit in the braking mode in accordance with the first basic concept, the primary impeller serves the function of a stator wheel. A modification is made in such a way that both the primary impeller and secondary impeller are disconnected from the drive shaft or the transmission input shaft during the driving mode. As a result, both wheels are stationary. This has then the advantage of avoiding the losses associated with free wheeling (windage) of both impellers that is normally caused by air being agitated between the impellers.

To achieve the second operating mode "braking" in accordance to the second basic concept, the secondary impeller is locked (fixed) and supported relative to the stationary transmission components. The secondary impeller performs the function of the stator wheel. The primary impeller is torsionally-solidly connected to the transmission input shaft and is, via the transmission output shaft, driven in the same rotational direction, just as during the initial vehicle acceleration phase. It performs the function of the braking rotor. Thus, the operating fluid which resides in the toroid-shaped operating zone is churned in the same direction, just as during the initial acceleration phase. However, during braking, the fluid enters the fixed blading of the secondary impeller and is subsequently decelerated.

In terms of design considerations, there are first devices provided which give the transmission input shaft the ability to be coupled to the mechanical transmission unit. There are also second devices which give the secondary impeller the ability to be coupled to the connection between the transmission input shaft: and the mechanical transmission unit. A third device serves to lock the secondary impeller during the second operating mode. The primary impeller is connected in a torsionally-solid fashion to the transmission input shaft. Here, too, the individual methods are preferably realized in the form of shift devices, especially hydraulic shift devices. The first and second devices include mostly clutch devices. The third device includes at least one brake device.

In this preferred design which serves to achieve the second operating mode according to the second basic concept, an adjustment of the braking torque can be achieved solely by changing the degree of filling of the toroid-shaped operating zone and by fixing (locking) the secondary impeller. This allows for an especially fast braking response.

The blading of the primary and secondary impellers are slanted in such a way that during the initial acceleration phase as well during the second operating mode, a "piercing" interaction develops between the two impellers. This implies the generation of high reactionary torque moments on the secondary impeller.

Another alternative for braking, according to the second basic concept, involves a changing of the rotational direction of the secondary impeller by, for example, applying the reverse gear. In this case, an interruption of the torque path from the engine to the primary impeller is required and can be achieved for example, by disconnecting the transmission input shaft from the engine.

The individual alternatives for the clutching and declutching of the primary and secondary impeller to the transmission input shaft, as well as the locking of the impellers relative to the stationary transmissions components, can be accomplished with hydraulic shift devices. The same applies for selecting the different gears in the mechanical unit of the transmission. These hydraulic shift devices are designed mostly in form of multi-friction elements that are pressed against each other. Other design alternatives are also possible. The concrete selection of the type of hydraulic shift devices and their application, however, depend on the requirements of the application and are left to the judgment of the expert.

For the design of the mechanical transmission componentry, there are a multitude of design options. It is possible to use spur gears and/or planetary gear sets to achieve the different gear ratios. In particular, there are, for example, Ravigneaux, planetary sets which, in terms of the overall length, are small but nevertheless allow the possibility of high speed and torque conversions. A preferred design includes at least three planetary gear sets, i.e., a first, a second, and a third planetary gear set. The individual planetary gear sets each include a sun gear, an internal ring gear, planetary gears and a carrier. The planetary gear sets are connected to each other. Each planetary gear set has at least one clutch device and/or brake device assigned. The activation of the individual hydraulic shift devices is accomplished by a control device, for example, the vehicle control module, and is contingent on the current driving conditions and the desires of the driver.

The operating condition "braking" can also be grouped into at least two partial operating conditions, especially when a multitude of hydraulic shift devices are activated or deactivated during the shift process. In a case such as this, it is preferred for part of the hydraulic shift devices to remain activated.

According to the solutions provided in this invention, several operating conditions (modes) can be realized with one transmission concept which utilizes only one hydraulic transmission unit for transmitting power. Through the assignment of the functions "clutching" and "braking" to one hydrodynamic unit, savings in design space are realized. Furthermore, this concept is in line with the current trends in development which strive for smaller hydrodynamic transmission units and serve, therefore, to reduce fuel consumption. Another significant advantage is that one transmission or transmission configuration can offer an optimum fit to different engines and vehicles with a minimum of design variations (options), mainly due to the control of filling of the hydrodynamic transmission unit. That means that the transmission can be applied universally across a large power range. It is also possible to simplify the damping of the torsional vibration. With continuous braking and continuous accelerations from a stop, which typically occur in stop-and-go traffic, significant reductions in noise emissions of the engine are observed.

Through control of the filling process, the speed behavior of every power source, especially of every internal combustion engine, can be influenced during the initial acceleration phase with respect to noise and exhaust emissions. Especially during the operating mode "braking", the concept of assigning function offers significant advantages relative to conventional solutions. Such conventional solutions in essence use a separate retarder mounted on the rear of the transmission, or solutions that develop the braking moment with the hydrodynamic torque converter. In accordance with the solutions provided by this invention, there are sufficient constant braking moments possible down to low vehicle speeds. During the entire braking mode, no shifts are necessary. The noise generation in the operating mode "braking" is, therefore, very low. During braking, such is required to adopt to the traffic flow as well as to bring the vehicle to a stop, the engine remains uncoupled and is in idle state. Only when the oil temperature reaches a critical threshold will the engine speed increase in order to improve the water circulation. This, however, is only necessary during extended downhill operation. Fast response times in changing the functions (operating modes) are realized when filling is done in conjunction with an accumulator. The hydrodynamic design element requires a lower amount of oil filling compared to a hydrodynamic torque converter.

During the operating mode "driving", there are no losses associated with the retarder since both the primary impeller and secondary impeller rotate at the same rotational speed and the retarder is devoid of fluid.

In accordance with this invention, the designed transmission unit distinguishes itself through universal application capability, low fuel consumption, low manufacturing cost, as well as long durability. The possible drive and braking moments are determined corresponding to the design layout of the hydrodynamic unit. The link to the downstream mechanical transmission units allows a high gear ratio separation and permits applications in city and highway-type vehicles.

The portion of power that is to be transmitted by the hydraulic transmission unit is reduced compared to conventional solutions. The hydrodynamic transmission unit with the two functions "clutching" and "braking" offers the alternative to shape (modify) the initial acceleration phase such that the engine as well as hydrodynamic componentry increase in speed in the most optimum (efficient) fashion. On today's typical torque converters, the engine speed increase is determined by the converter resistance which depends on the geometry of the blading and the outline dimensions of the converter. As a rule, equilibrium is reached at unnecessarily high rotational speeds, which is associated with high fuel consumption, high exhaust emissions, and high engine noise emissions. These are important consideration in the decision-making process for a transmission. In specific terms, that means that the transmission offers a low resistance in the lower speed range such that the engine quickly escapes from the inefficient operating range which is characterized by low torque generation and soot formation. The regulation of the engine speed occurs at a desired speed level during the subsequent vehicle acceleration by controlling the filling of the coupling. Through the selection of the appropriate torque capability of the coupling, the power source is connected to the mechanical gearing nearly slip-free. During driving using the mechanical gears, the hydrodynamic transmission unit runs in a connected fashion and is devoid of fluid. Thus, there are no windage losses.

Through the utilization of only one hydrodynamic transmission unit in the total transmission package, the number of the possible transmission options (design variations) can be reduced since the adaptation to different operating conditions can be achieved by changing the degree of filling.

In particular, this concept is especially applicable for multi-gear transmissions, specifically for 5 and 6 speed transmissions.

With the assignment of the functions "clutching" and "braking" to a hydrodynamic transmission unit, the following characteristics can be achieved. The adaptation of the required torques during driving and braking can be achieved by controlling the degree of filling. This allows a broader torque range from zero to a maximum value, a good dynamic characteristic due to a low-volume fluid circuitry and no loss due to repeat operations, which results from prioritized emptying of the hydrodynamic transmission units into an accumulator.

Achieved are lower noise emissions during the initial acceleration phase and lower noise emissions through declutching of the engine during braking, since the engine is at idle during all modulated and full-stop braking. Improved environmental effects are further achieved through a lower oil change capacity, as well as longer oil change intervals, which is the result of decreased thermal loading due to larger amounts of oil being circulated during braking and during the initial acceleration phase. Furthermore, due to the design of the hydrodynamic transmission, a significantly broader range of wear-free braking can be achieved.

During the initial acceleration phase, the objective is to disconnect the engine from the transmission after full power has been achieved. On the way to the point of transition, the torques that are being transmitted by the transmission should be as low as possible so that full power can be quickly reached for the engine non-optimum range. The initial acceleration phase can be sub-divided into the following two phases:

1. Run-up of the engine to the transition point, i.e., the point at which engine is declutched.

2. Regulation characteristic after the transition point has been reached.

There are several alternatives to realize these characteristics:

1. Control constant filling process independent of the engine speed.

2. Speed-dependent control of the filling process.

3. Admission of a measured amount through controlled activation duration of the accumulator.

The control characteristics after reaching the transition point is distinguished by a speed regulation of the engine. In the first case, the intensity of the filling process depends upon the desired transfer capability which is derived from the characteristic operating curve of the power source. Through appropriate specification or pre-definition of the desired pressure, the hydrodynamic transmission unit already has the proper degree of filling with the engine still at idle. Thus, when the engine accelerates, almost no change in the degree of filling is required to reach the desired transition point. For that purpose, the primary impeller must already be connected when the idle speed is reached.

With the primary impeller being disconnected, the operating zone is filled completely. The possibility then exists that the degree of filling self-adjusts to the desired value during run-up of the engine, so that the excess operating fluid is centrifuged outward.

With the speed-dependent control of the filling process, the operating zone of the hydrodynamic transmission unit is devoid of fluid. Only with the appropriate specification or pre-definition of the throttle, and with the attainment of a certain rotational speed of the power source, will the desired degree of filling be set. The primary impeller clutch, which is set to a configuration to realize braking according to the first basic concept, can be activated or released, whereby an activated primary impeller clutch is released as soon as possible after activation of the throttle or after the end of a brake signal.

There is also the possibility of admitting a targeted amount of operating fluid into the operating zone through control of the activation duration of the accumulator, which is an integral part of the operating fluid supply system of the hydrodynamic transmission unit. For that purpose, the operating zone of the hydrodynamic transmission unit is devoid of fluid at the starting point. When a certain rotational speed of the power source is reached, as well as at an appropriate throttle position, an engine-specific oil quantity is admitted into the operating zone by the accumulator integrated into the hydrodynamic transmission unit. The primary impeller clutch can thereby be activated or released. In the released state, it should be activated as soon as possible after activation of the throttle or after the end of a brake signal. At any stopping procedures, with preferably the same initial conditions, attention should be paid to the operating zone of the hydrodynamic transmission unit to be sure that it can be fully emptied prior to the release of the primary impeller clutch.

As soon as the transition point is reached, the control module switches over to a speed regulation mode of the power source. The activation of the accumulator is halted. As soon as the vehicle begins its motion and hence, initiates an increase in the rotational speed of the secondary impeller, the degree of filling into the operating zone of the hydrodynamic transmission component increases due to the speed regulation. This, in turn, attempts to keep the engine at "clutching" speed. With the operating zone fully filled, the synchronized rotational speed to the mechanical gearing is nearly met. Through closing of the bypass clutch between the transmission input shaft and the secondary impeller, the power source is without significant change in rotational speed, fully synchronized with the transmission output shaft and the vehicle is in first mechanical gear.

In order to dampen the torsional vibrations during the initial acceleration process, a vibration damper is provided. Because of the pure hydraulic nature of the initial acceleration, a single spring characteristic is sufficient. Thus, the damper unit includes at least one spring. This unit is preferably mounted between the input shaft and the splines of the outer multi-friction elements of the bypass coupling. Other devices are also possible.

There is also a possibility to assemble a hydrodynamic transmission unit including a primary impeller and a secondary impeller as a pre-assembled unit with an appropriate housing. In doing so, the individual impellers, especially the primary impeller, receive the devices required to connect to a drive shaft and to lock the impeller in place. The latter is mounted on the housing.

Due to the high efficiency of the hydrodynamic unit, which is certainly higher than the efficiency of a hydrodynamic torque converter, it can remain active in the lower gears. This improves the driveability and the shift transition behavior significantly due to the hydraulically "soft" connection to the engine. The activation of the bypass clutch can occur depending on the acceleration of the vehicle, or its activation can be moved into the upper speed range where the mechanical operation no longer presents any problems.

Relative to the changing of the different gears, the same requirements that are valid for other transmissions apply. The power source, especially the internal combustion engine, must be brought to the new synchronized rotational speed through the appropriate hydraulic shift devices as directly as possible and without hesitation. To this end, a shallow overlap is applied in the on-and-off activation of the hydraulic shift devices and the to-be-activated gear is provided with an appropriate pressure build-up.

During shifting across a cluster, the cluster clutch becomes synchronized with the internal combustion engine without significant pressure build-up. This then has the consequence of a smooth change in gears without significant pressure build-up and with the help of the stated overlap. Therefore, no significant consequences emerge to affect the transmission output shaft because only a few internal transmission components need to be synchronized.

The transmission, furthermore, offers a very high efficiency over the entire operating range, and all the design changes that are implemented are improvements over current transmission technology, as far as the shift comfort (quality) and driveability are concerned. During the operating mode "driving", the hydrodynamic coupling is operated at the maximum level in terms of filling and therefore offers very little slip and subsequently an excellent efficiency that can lie, depending on load and speed, between 90% and 99%. These values are not achieved by any of the currently available torque converters. The hydrodynamic unit, which operates as a clutch during initial acceleration, clutches aggressively. Nevertheless, it remains a hydraulic transmission unit with all its advantages, such as the damping of the torsional vibration and the lowering of the noise emissions. During all subsequent shifts, the slip of the hydrodynamic unit increases, the clutching becomes softer and achieves values which correspond to those of a hydrodynamic torque converter. The changing of individual gears during the first operating mode can be accomplished uninterrupted. The unavoidable resultant slip can be transferred into the hydrodynamic unit and can subsequently be lowered through control of the filling process. In this way, smooth transitions between the individual gears can be achieved, while at the same time realizing a lowering of the stresses on the hydraulic shift devices.

Also, in the event of a sudden load change, the slip of the hydrodynamic unit can also be temporarily increased such that a hydraulically soft connection is achieved. Moreover, the support forces in the motoring mode are very low. The dreaded jolt, as a result of rapid load changes, is no longer an issue. In addition, the key operating characteristic of the elastic damper that is being used is improved with respect to its properties during load changes. When the changing of the individual gears during the first operating mode no longer exhibits damaging effects on the shift comfort (quality), the hydrodynamic unit is then bypassed as long as it operates in the operating mode "driving". This function is performed by appropriate control of the fill and drain events.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a control schematic for the activation of the individual hydraulic shift devices of the transmission according to FIG. 1;

FIG. 5a is a side, sectional view of the damper unit of FIG. 4;

FIG. 5b is a cross-sectional view of the damper unit of FIG. 5a;

FIG. 7a is a simplified cross-sectional view of a third embodiment of a transmission of the present invention; and FIG. 7b is a table of the control logic for the activation of the individual hydraulic shift devices of the transmission of FIG. 7a.

Corresponding reference characters indicate corresponding parts throughout the several views. The exemplifications set out herein illustrate one preferred embodiment of the invention, in one form, and such exemplification are not to be construed as limiting the scope of the invention in any manner.

DETAILED DESCRIPTION OF THE INVENTION

Figure 1:
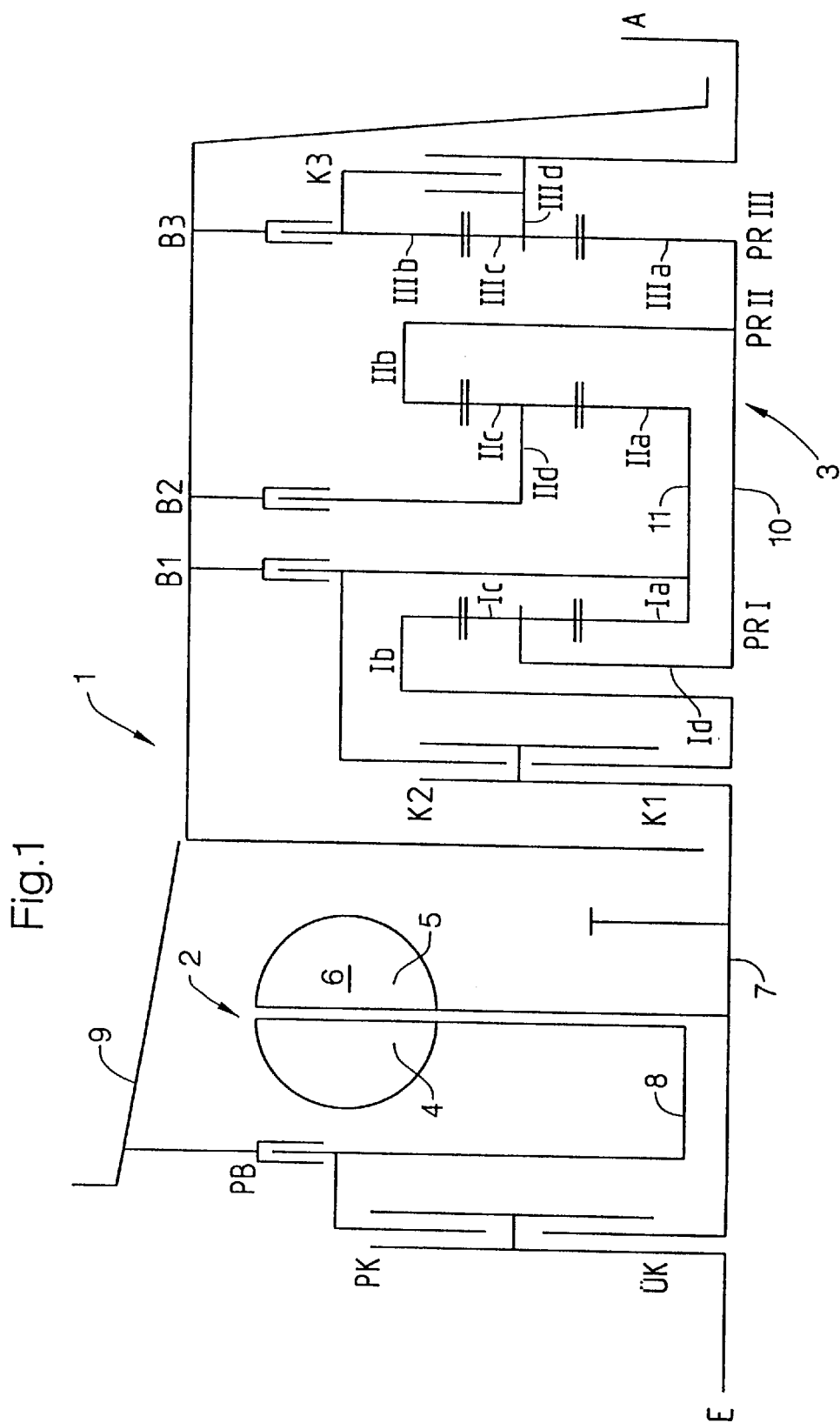
FIG. 1 is a schematic, simplified cross-sectional view of one embodiment of a transmission of the present invention for the generation of braking torque.

Referring now to the drawings and particularly to FIG. 1, there is shown a simplified representation of an axial cross section of a transmission unit 1 equipped with a transmission input shaft E and a transmission output shaft A. The transmission unit 1 further has a first hydraulic transmission unit 2 and a second mechanical transmission unit 3. The first hydraulic transmission unit 2 has at least two impellers, a first impeller and a second impeller. The first impeller is referred to as a primary impeller 4 and the second impeller is referred to as a secondary impeller 5. The primary impeller 4 and the secondary impeller 5 together form a toroid-shaped operating zone which can be filled with operating fluid. For this purpose, the toroid-shaped operating zone has been assigned an operating fluid supply system which is not shown in detail. The hydraulic transmission unit 2 is applied to a vehicle which utilizes two operating modes, a first operating mode called "driving" and a second operating mode called "braking". As such, it serves the functions of a clutch as well as a hydrodynamic retarder. For that purpose, the individual impellers, the primary impeller 4 and the secondary impeller 5, each have differing functions. During the first operating mode, especially during the initial acceleration phase, the primary impeller 4 functions as a so-called compressor wheel and the secondary impeller 5 functions as a turbine wheel. During the second operating mode "braking", the primary impeller 4 performs the function of a stator wheel of a hydrodynamic retarder. The secondary impeller 5 performs the function of a braking rotor. In order to realize these functions, appropriate devices that allow the assignment of these function in the stated manner must be provided. The secondary impeller 5 is permanently and torsionally-solidly connected to the transmission unit 3 through a transfer shaft 7. The transfer shaft 7 is, via a "pass-through coupling" UK (also called a bypass coupling), capable of being coupled to the transmission input shaft E. Through this coupling UK, the secondary impeller 5 is linkable to the transmission input shaft E. The primary impeller 4 can be coupled to the transmission input shaft E through the so-called primary impeller clutch PK. The primary impeller 4 should be mounted solidly on the transfer shaft 8, whereby the transfer shaft 8 can be coupled to the transmission input shaft E via the primary impeller clutch PK. The transfer shaft 8 has a brake device attached, in the form of a primary impeller brake PB. This primary brake device PB is solidly supported by a stationary transmission component, preferably the transmission housing 9, as indicated here.

The secondary impeller 5 can be coupled to the mechanical transmission unit 3 through the transfer shaft 7. The second mechanical transmission unit 3 is equipped as shown with three sets of planetary gears, a first planetary gear set PRI, a second planetary gear set PRII, and a third planetary gear set PRIII. The individual planetary gear sets each include a sun gear, designated with I$a$ for the first planetary gear set PRI, II$a$ for the second planetary gear set PRII, and III$a$ for the third planetary gear set PRIII. Further, each set includes a ring gear and a carrier. The ring gears of the individual planetary gear sets are designated with I$b$ for the first planetary gear set PRI, II$b$ for the second planetary gear set PRII, and III$b$ for the third planetary gear set PRIII. The carriers of each planetary gear set are designated with I$d$, II$d$, and III$d$. At least the first transmission unit of the first planetary gear set PRI, the second planetary gear set PRII, and the third planetary gear set PRIII are connected to each other via transmission shaft 10. These transmission components should be mounted on the transmission shaft 10 in a torsionally-solid manner. The first transmission unit of the first planetary gear set is formed by carrier I$d$, the first transmission unit of the second planetary set PRII is formed by ring gear II$b$ and the first transmission unit of the third planetary set PRIII is formed by the sun gear III$a$. Second transmission units of the first and second planetary gear sets PRI and PRII are also connected to each other. The second transmission units are thereby formed by the sun gear I$a$ in the first planetary set PRI, and by the sun gear II$a$ in the secondary planetary set PRII. For that purpose, both sun gears, the sun gears of the first and second planetary gear sets, are mounted torsionally-solidly on a common shaft 11 which can be of a hollow design. The transmission shaft between the hydraulic transmission unit 2 and the mechanical transmission unit 3 can be connected (coupled) to the first planetary gear set PRI by use of a clutch device K1. A second coupling element K2 is attached, at least indirectly, to the connection, preferably to the transmission shaft between the two second gear elements of the first planetary set PRI and the second planetary set PRII, which are formed by the sun gears I*a* and II*a*, respectively.

A second transmission unit of the third planetary gear set PRIII is formed by the carrier III*d*. The carrier III*d* is thereby connectable in a torsionally-solid fashion to the transmission output shaft A. Preferably, the carrier III*d* of the third planetary gear set is torsionally-solidly coupled to the transmission output shaft A. The ring gear III*b* is thereby connectable through a third clutch device K3 torsionally-solidly to the carrier and hence, also can be coupled to the transmission output shaft A.

To each planetary gear set PRI, PRII and PRIII, there is a brake device assigned. A first brake device B1 serves to lock the connection between the two sun gears I*a* and II*a* of the two planetary gear sets PRI and PRII. A second brake device B2 serves to lock a third transmission unit of the second planetary gear set, which is formed by the carrier II*d*. A third brake device B3 is assigned to the third transmission unit of the third planetary gear set PRIII, which is formed by the ring gear III*b*.

The design details of the above-described arrangement will depend upon the judgment of the expert. For the realization of individual operating modes and gears shifts, the assignment of the individual clutch devices K and brake devices B, with respect to the individual gear steps, should be determined correspondingly. Also, the design of the mechanical transmission unit can be arranged in various ways. Specifically, the gear sets are, for example, made of spur gears, planetary gear sets, or a combination of both. The individual brake devices B1, B2 and B3 are thereby mounted mostly on non-moving components of the transmission such as the housing or the housing wall 9.

There are several variations imaginable for the design of the individual hydraulic shift devices, the bypass clutch UK, the primary impeller clutch PK, the primary impeller brake PB, the individual clutch devices K and the brake devices B. These are mostly frictional disks or more specifically hydraulic clutch disks. To the expert, there are numerous design options available that are state of the art. FIG. 1 illustrates a preferred design solution of a mechanical transmission unit in a combination with a hydrodynamic unit that has the capability of operating in the different functional modes. Other design variations are possible.

FIG. 2 shows an overview of the operating conditions (modes) and the individual gear steps that are realized by the transmission as described in FIG. 1. As already indicated, the transmission unit described with FIG. 1 is a preferred design through which the functionality of a hydrodynamic coupling or a hydrodynamic retarder will be illustrated and explained. Specifically the two basic operating modes of driving and braking will be differentiated. The operating mode "driving" includes, as shown in the illustrated example, the gears 1 through 6 as well as two reverse gears. The operating mode "braking" includes two braking stages, a first braking stage and a second braking stage. During the first operating mode, while in first gear (used for initial vehicle acceleration), the primary impeller clutch PK is activated and thereby connects the transmission input shaft E to the primary impeller 4 via the transmission shaft 8. The connection between the hydraulic transmission unit 2 and the mechanical transmission unit 3 will be realized through the first clutch device K1. Furthermore, the second and third brake devices are activated. The hydraulic unit 2, especially the toroid-shaped operating zone 6, is in this condition filled with operating fluid. The torque path or power transmission via the transmission input shaft E, which is at least indirectly connectable with the power source (not shown here), is formed by the primary impeller coupling PK, the primary impeller 4, the secondary impeller 5 via the first coupling element K1, the first planetary gear set PRI, especially the ring gear I*b* of the first planetary gear set on carrier III*d* of the third planetary gear set, and the transmission output shaft A. Shaft A can at least indirectly be brought into connection with the to-be-propelled device, for example the wheels of a vehicle.

During initial vehicle acceleration, the hydraulic transmission unit 2 functions as a hydraulic clutch. Filling occurs in the operating mode "driving" only during the initial acceleration phase. During the transition into the second gear, the hydraulic transmission unit 2, especially the toroid-shaped operating zone 6, is emptied. The first clutch device K1 as well as the third brake device B3 and the primary impeller clutch, remain activated. The second brake device B2 is released and the first brake device B1 is activated. With this gear setting, the bypass clutch UK, which connects the transmission input shaft E with the secondary impeller 5 and transmission shaft, respectively, can be activated or de-activated. This depends upon how far the function of the hydrodynamic transmission unit 2 reaches, as a hydrodynamic coupling, into the second gear. In this case, the operating zone of the hydraulic transmission unit 2 is filled with operating fluid even when operating in the second gear. If, however, there is a direct connection between the transmission input shaft E and the mechanical transmission unit 3, the toroid-shaped operating zone 6 of the hydrodynamic transmission unit is emptied. In this case, the torque path goes from the transmission input shaft E via the bypass clutch UK, the transmission shaft 7, the first clutch device K1 to the ring gear I*b* of the first planetary gear set PRI, onto the carrier I*d* of the first planetary gear set and via the transmission shaft 10 onto the carrier III*d* of the third planetary gear set, and thus to the transmission output shaft A.

In this second gear, the transmission shaft 7 is also driven, due to a torsionally-solid connection between the secondary impeller 5 and the transmission shaft 7. This has the consequence of generating windage losses (blade-pass losses) in the fluidless, toroid-shaped operating zone 6 due to air masses being agitated between the two impellers, the secondary impeller 5 and the primary impeller 4. Therefore, it is preferred that during the operation of all gears, the primary clutch PK is additionally activated. This makes it possible for the primary impeller 4 together with the secondary impeller 5 to rotate at the same velocity/rotational speed. The windage losses, due to agitated and decelerated air masses between the two impellers, are therefore avoided. There are no additional, extravagant devices needed that are being used on state-of-the-art retarders.

In third gear, the first clutch device K1, the second clutch device K2 and the third brake device B3 are activated in addition to the bypass clutch UK and the primary impeller clutch PK. All other hydraulic shift devices are disengaged. The torque path, therefore, traverses through the transmission input shaft E, the bypass clutch UK, the transmission shaft 7 across the first clutch device K1 to the first planetary gear set PRI, in particular to the ring gear I*b* of the first planetary gear set PRI. A further portion of the total power will be transmitted across the second clutch device K2 onto the sun gear I*a* of the first planetary gear set PRI. The power portions that are merging on the carrier I*d* of the first planetary gear set PRI are then transmitted via the carrier of the third planetary gear set PRIII onto the transmission output shaft A.

In fourth gear, the first clutch device K1, the third clutch device K3, the bypass clutch UK, the primary impeller clutch PK, and the second brake device B2, are activated. All other hydraulic shift devices are disengaged. By use of the second brake device B2, the carrier IId of the second planetary gear set PRII will be locked in place. The ring gear IIIb of the third planetary gear set PRIII is connected to the carrier IIId of the third planetary gear set in a torsionally-solid manner. The power transfer occurs from the transmission input shaft E via the bypass clutch UK, the transmission shaft 7, the first clutch device K1 to the ring gear Ib of the first planetary gear set PRI, over the second planetary gear set PRII, the transmission shaft 10 to the planet gears IIIc of the third planetary gear set PRIII, which drives the carrier (which is attached to the ring gear) of the third planetary gear set PRIII which, in turn, drives transmission output shaft A.

In fifth gear, only the second brake device B2 is released, and the first brake device B1 is activated. This means that the connection between the first planetary gear set PRI and the second planetary gear set PRII, especially the transmission shaft 11, is locked in place. The sun gears Ia and IIa of the two planetary gear sets PRI and PRII are thereby stationary. The torque transfer occurs once again over the transmission input shaft 7, the bypass clutch UK, the transmission shaft 7, the first clutch device K1, the ring gear Ib of the first planetary gear set PRI, and across the carrier IIId of the third planetary gear set PRIII which, in turn, drives the transmission output shaft A.

The sixth gear differs from the fifth gear in that all three clutch devices K1, K2 and K3 are activated, while all brake devices B1, B2 and B3 are released.

A reversal in rotational direction of the "reverse" gears of the first operating mode are also realized through a specific combination of the hydraulic shift devices (clutch and brake devices) in terms of their activation. For that purpose, the (first) reverse gear substantially requires the primary impeller clutch PK, the second brake device B2, the second clutch device K2 and the third brake device B3 to be activated. In (second) reverse gear, the third brake device B3 is released and the third clutch device K3 is activated. The release and the activation of the individual clutch and brake devices for the realization of the reverse gears allows a change in the rotational direction of the transmission output shaft A.

In accordance to the gears that are applied, the hydraulic shift devices K3 and B3 (also called clusters and cluster brakes) should remain activated. The other brake and clutch devices are released or engaged. Thereby, the operating mode "braking" will be grouped into two stages.

During the second operating mode "braking", the hydraulic, or more specifically, the hydrodynamic transmission unit 2 is operated as a brake. The function of the stator wheel is performed by the primary impeller 4, which is held in place by the primary impeller brake PB. With the transmission as illustrated by FIG. 1, substantially two stages of braking can be realized by engaging the particular reverse gears of the transmission unit 3. UK is released in both stages of braking. It can, however, based on the premise that the power source is disengaged from the transmission, remain activated.

In order to establish a connection from the transmission shaft 7 to the second transmission unit 3, the first clutch device K1 is activated. Furthermore, the third clutch device K3 is activated during the first braking mode. This means that the ring gear IIIb of the third planetary gear set PRIII is connected torsionally-solidly to the carrier IIId of the third planetary gear set PRIII and therefore to the transmission output shaft A. In the second braking mode, the third clutch device K3 is released and the third brake device B3 is activated. The second brake device B2 is also closed in both stages of braking. This means that the carrier IId of the second planetary gear set is stationary. In this operating condition, the secondary impeller 5 will be driven by the motoring transmission output shaft A over the individual hydraulic shift elements of the mechanical transmission. It performs the function of a braking rotor of a hydrodynamic retarder. The fluid circuit in the toroid-shaped operating zone 6 runs in the opposite direction relative to the direction established during initial acceleration in the first operating mode of the hydraulic transmission unit 2.

In the first operating mode "driving", especially during initial vehicle acceleration, the hydraulic transmission unit 2 operates in a "piercing" fashion. The second operating mode "braking," when activating the braking stages through the reverse gears, is also "piercing" due to the blading of the impeller and the different rotational direction of the secondary impeller 5.

Figure 3A:
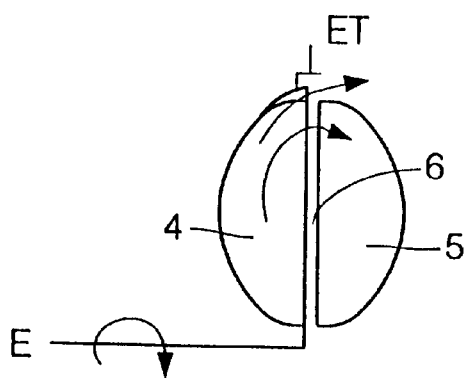
FIG. 3a is a schematic view of the hydrodynamic transmission unit of the transmission of FIG. 1 during the initial acceleration phase and during the first operating mode.
Figure 3A:
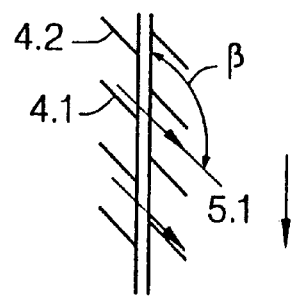
Figure 3B:
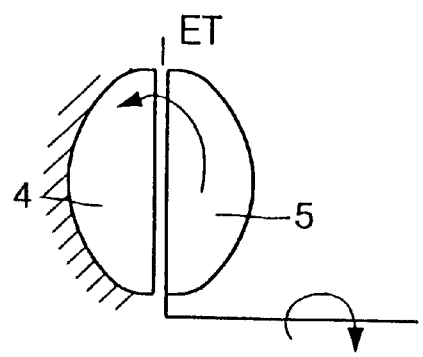
FIG. 3b is a schematic view of the hydrodynamic transmission unit of the transmission of FIG. 1 during the second operating mode.
Figure 3B:
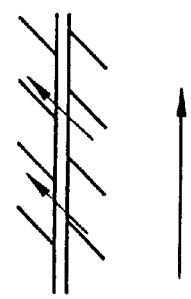

FIGS. 3a and 3b are each a cross-sectional depiction of the hydraulic transmission unit 2; in particular the primary impeller 4 and the secondary impeller 5, whose operating modes are illustrated in simplified and schematic form. For same elements, the same reference symbols are used.

FIG. 3a illustrates the operating method of the hydrodynamic transmission unit 2 during initial vehicle acceleration. This depiction shows that the operating fluid in the area between two neighboring blades 4.1 and 4.2 of the primary impeller 4 (driven by the transmission input shaft E) is, due to its own rotation, deflected on the backside of the blading of the secondary impeller 5 as indicated at 5.1. This means that a closed circuit of the operating fluid between the primary and secondary impellers has been established and torque will be transmitted. This operating mode of the primary impeller relative to the secondary impellers is called "piercing".

In the operating mode "braking", the hydrodynamic unit 2 is also filled with operating fluid. Due to the slanted blading design, a closed operating fluid circuit forms between the secondary impeller 5 functioning as a braking rotor and the primary impeller 4 functioning as a stator wheel. The propelled secondary impeller 5 converts the incoming mechanical energy, with the circuit filled with fluid, into fluid-dynamic energy which is converted into thermal energy on the stationary primary impeller 4. The secondary impeller 5 runs in opposite direction in relation to the direction encountered during initial acceleration.

FIG. 3a illustrates, in the first operating mode "driving", the operating mode of the hydraulic transmission unit 2 as a clutch during initial vehicle acceleration and, eventually, during part of a subsequent gear step. In this case, the primary impeller 4 is propelled by the transmission input shaft E. The rotational direction is determined by the directly coupled drive shaft of a power source, or by torque transmission elements that are connected in series. By rotation of the primary impeller 4 relative to the secondary impeller 5, the impeller blades are positioned relative to each other in such a way that the hydraulic unit works in the "piercing" fashion.

FIG. 3b illustrates the hydraulic transmission unit 2 in the operating mode "braking" when the direction of rotation of the secondary impeller 5 is reversed. In this operating condition, the primary impeller 4 is stationary and fixed relative to the housing 9. Secondary impeller 5 is driven by the transmission output shaft A through the reverse gears of the mechanical transmission unit 3. Due to the change in the driving sides between the operating conditions "driving" and "braking", a working circuit is formed in the toroid-shaped operating zone 6, which, during braking mode, works against the circuit that is normally observed in the clutch mode. The operating modes of both impellers are likewise "piercing".

The illustration of the blading structure of both impellers shown by FIGS. 3a and 3b depicts the slant of the individual blades relative to a separation plane ET that is formed between the primary impeller 4 and the secondary impeller 5.

Figure 4:
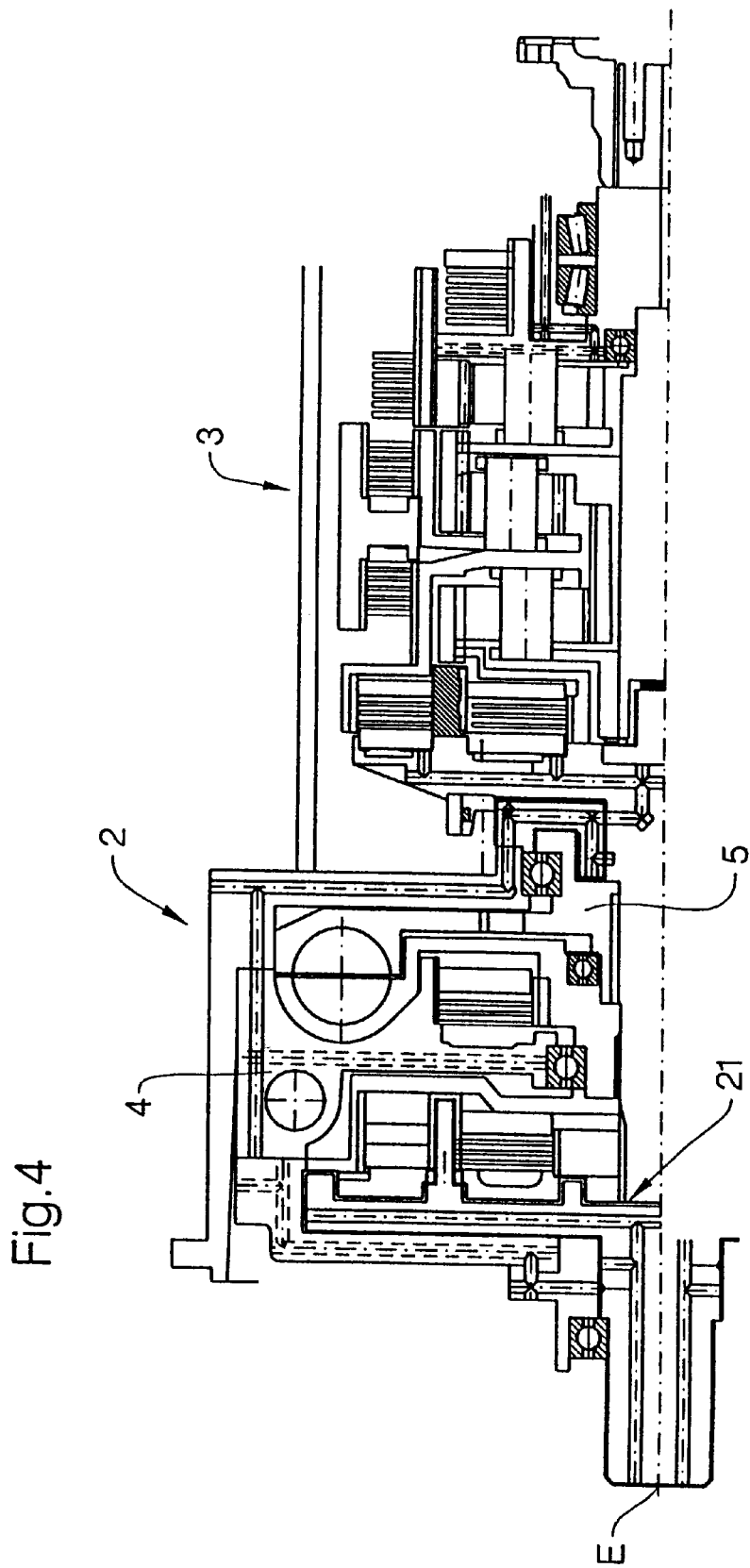
FIG. 4 is a schematic, cross-sectional view of the transmission of FIG. 1.

FIG. 4 illustrates, by use of a cross section of a transmission, the arrangement of a damper unit 21 that is connected in series with a hydrodynamic transmission unit 2. This damping element 21 is mounted between the transmission input side and the splines of the outer multi-friction elements of the bypass coupling.

Figure 5:
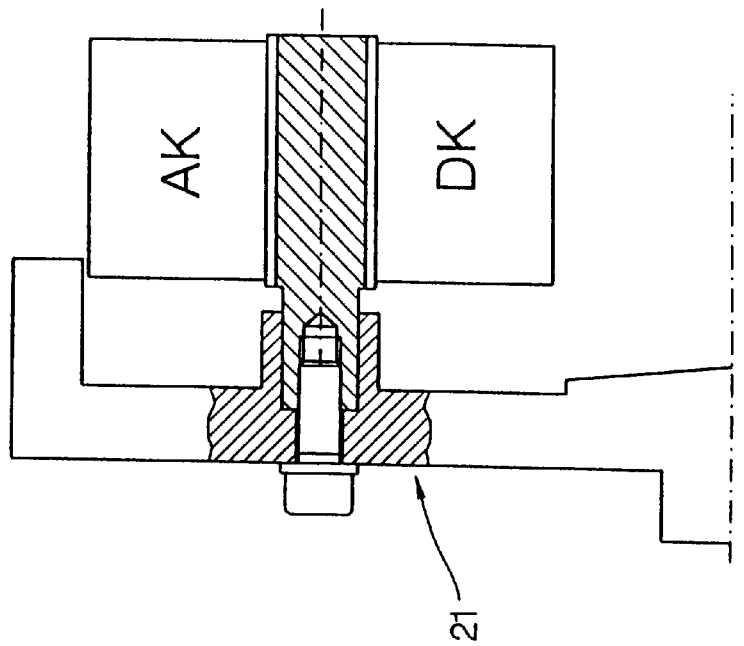
Figure 5:
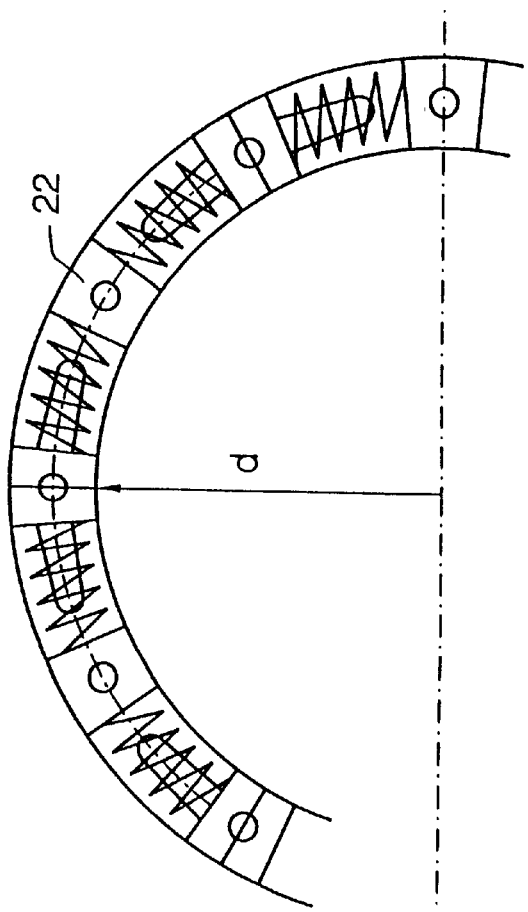

FIGS. 5a and 5b show the construction in detail. The damper unit 21 is disk-shaped and shows a multitude of torque support units 22 that are arranged circumferentially on a certain diameter. Between these support units reside energy-absorbing elements in form of springs 23.

Figure 6:
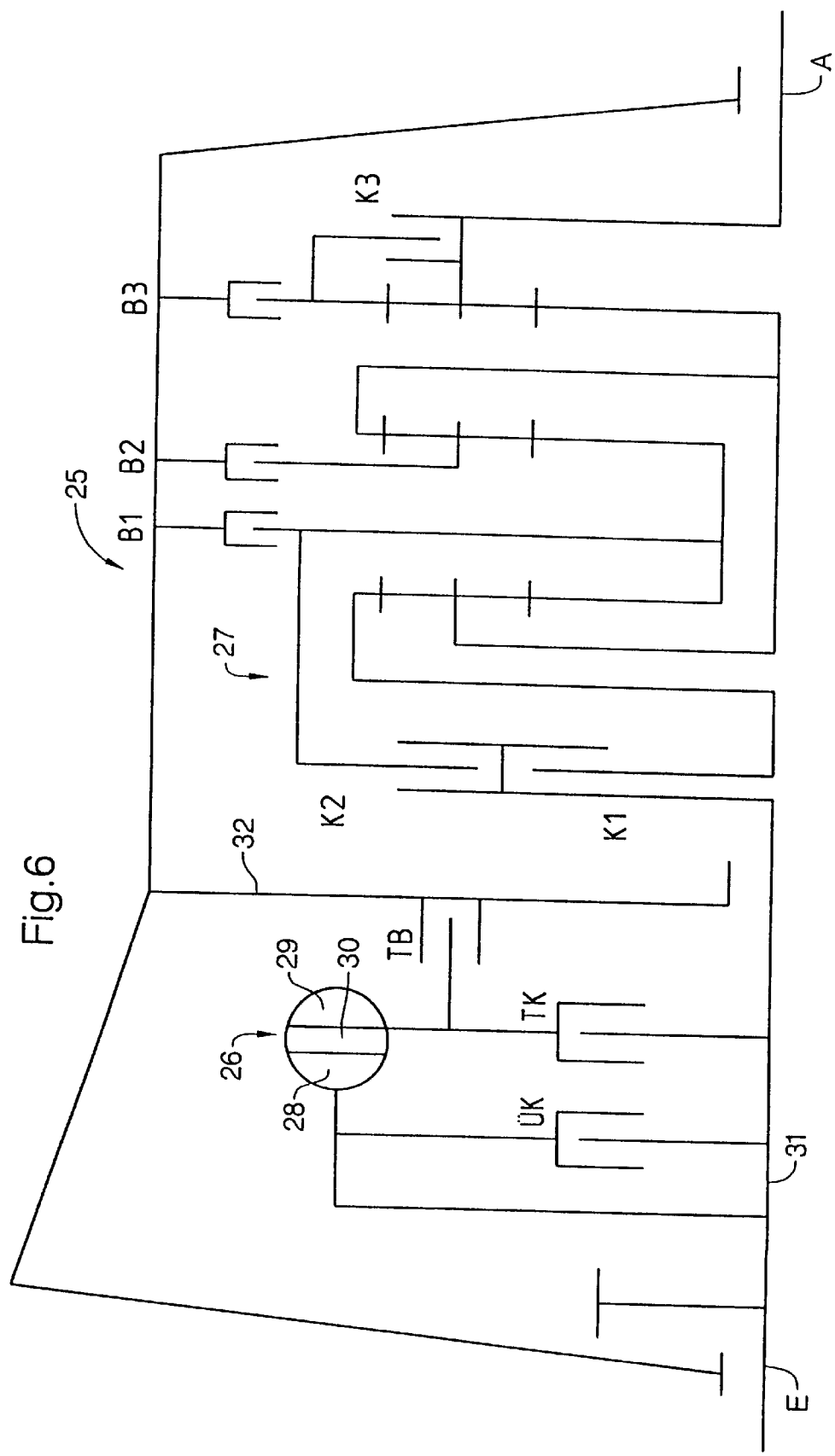
FIG. 6 is a schematic, simplified cross-sectional view of another embodiment of a transmission of the present invention for the generation of braking torque.

FIG. 6 is a simplified, schematic cross section of a transmission unit 25 for the generation of braking torque according to the second basic concept. The transmission unit 25 includes a transmission input shaft E, a transmission output shaft A, a hydraulic transmission unit 26 and a mechanical transmission unit 27. The hydraulic transmission unit 26 includes a hydrodynamic transmission unit with at least two impellers, a secondary impeller 28 and a primary impeller 29. The primary impeller 28 and the secondary impeller 29 together form a toroid-shaped operating zone 30 which can be filled with operating fluid. For this purpose, the toroid-shaped operating zone 30 has been assigned an operating fluid supply system, which is not shown in detail. The hydraulic transmission unit 26 is applied to a vehicle which utilizes two operating modes, a first operating mode called "driving" and a second operating mode called "braking". As such, it serves the functions of a clutch as well as a hydrodynamic retarder. For that purpose, the individual impellers 28 and 29 each perform differing functions. During operation, especially during the initial acceleration phase, the primary impeller 28 functions as a so-called compressor wheel and the secondary impeller 29 functions as a turbine wheel. During the second operating mode "braking", the secondary impeller 29 performs the function of a stator wheel of a hydrodynamic retarder. The primary impeller 28 performs the function of a braking rotor. In order to realize these functions, appropriate devices that allow the assignment of these functions in the stated manner must be provided. The primary impeller 28 is permanently and torsionally-solidly connected to the transmission input shaft E. The second mechanical transmission unit 27 is, via a "pass-through coupling" (also called a bypass clutch UK) capable of being coupled to the transmission input shaft E. Through this coupling, the secondary impeller 29 is linkable to the transmission input shaft E. The secondary impeller 29 is, by use of a secondary impeller clutch TK, capable of being coupled to the mechanical transmission unit 27, in particular, the transmission shaft 31 which resides between bypass clutch UK and the mechanical transmission unit 27. The secondary impeller 29 is assigned a brake device, which is here referred to as secondary impeller brake device TB. This secondary impeller brake device TB is fixed to a stationary transmission part, preferably to the transmission housing 32 as illustrated.

The mechanical transmission unit 27 includes, in the illustrated case analogous to the transmission configuration illustrated by FIG. 1, three planetary gear sets, a first planetary gear set PRI, a second planetary gear set PRII, and a third planetary gear set PRIII. Relative to the design and assignment of the individual hydraulic shift devices, reference is made to the design of the mechanical transmission unit shown in FIG. 1. This also applies to the activation and de-activation of the individual hydraulic shift devices that are assigned to the transmission componentry of the mechanical transmission unit 27. FIG. 1 serves as reference with respect to design details.

The functionality of the hydrodynamic transmission unit can be described as follows:

During the first operating mode, and during initial vehicle acceleration, the toroid-shaped operating zone 30 is filled with operating fluid. The bypass clutch UK is released. The secondary impeller clutch TK is activated. The torque path or power transfer path occurs through the transmission input shaft E, which can be coupled directly to the power source (not shown), the primary impeller 28, the secondary impeller 29 and the transmission shaft 31 to the second transmission unit 27, and thus to the transmission output shaft A.

The hydraulic transmission unit 2 operates during initial vehicle acceleration as a hydrodynamic coupling. Filling occurs during the individual gear steps and during the operating mode "driving" substantially only during initial vehicle acceleration. During transition into second gear, the hydraulic transmission unit 26, especially the toroid-shaped operating zone 30, is emptied. In subsequent gears, the bypass clutch UK is activated. It couples the transmission shaft E to the mechanical transmission unit 27 by bypassing the hydraulic transmission unit 27. According to the activation and de-activation of the individual hydraulic shift devices, the rotational speeds and torque moments in the mechanical transmission unit 27 are altered.

During braking, the two impellers exchange functions. The secondary impeller 29 is fixed by use of the secondary impeller brake TB relative to the stationary transmission components and therefore performs the function of a stator wheel. The secondary impeller clutch TK is released. The bypass clutch UK remains activated and the primary impeller 28 is driven in the same direction (same as during initial vehicle acceleration) by the transmission output, particularly the transmission output shaft A, in accordance to the gears that are being activated in the mechanical transmission unit 27. The mechanical gears remain engaged.

With the blade layout of the individual impellers designed in a slanted fashion, the individual blades are directionally arranged in such a way that during the clutching mode in the first operating mode, as well as during the braking mode in the second operating mode, the hydraulic transmission unit 26 operates in the "piercing" fashion when the operating fluid is directionally constant within the toroid-shaped operating zone 30.

Figures 7A, 7B:
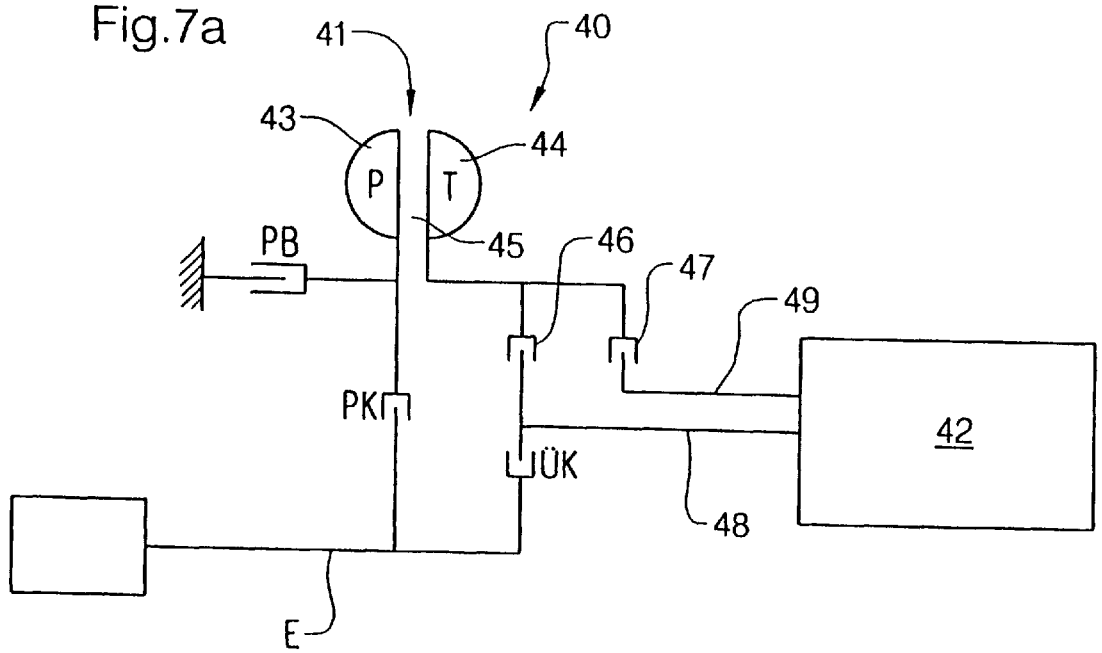

FIG. 7a illustrates schematically in simplified depiction an additional transmission configuration for generating braking torque according to the first basic concept. Fundamental differences relative to the transmission illustrated by FIG. 1 include the connection of the hydrodynamic coupling or the hydrodynamic retarder in the transmission, which is why these attachment possibilities are depicted separately.

FIG. 7a illustrates a transmission unit 40, including a first hydraulic and a second mechanical component. The transmission unit 40 is also equipped with a transmission input shaft E and a transmission output shaft A. The first hydraulic transmission unit 41 is equipped with a hydrodynamic transmission unit with at least two impellers. The first impeller is referred to as a primary impeller 43 and the second impeller is referred to as secondary impeller 44. The primary impeller 43 and the secondary impeller 44 together form a toroid-shaped operating zone 45, which is filled with operating fluid. For this purpose, the toroid-shaped operating zone 45 is assigned an operating fluid supply system, which is not shown in detail. The hydraulic transmission unit 41 is applied to a vehicle which utilizes two operating modes, a first operating mode called "driving" and a second operating mode called "braking". As such, it serves the functions of a clutch as well as a hydrodynamic retarder. For that purpose, the individual impellers, the primary impeller 43 and the secondary impeller 44, each perform differing functions. During the first operation, especially during the initial acceleration phase, the primary impeller 43 functions as a so-called compressor wheel and the secondary impeller 44 functions as a turbine wheel. During the second operating mode "braking", the primary impeller 43 performs the function of a stator wheel of a hydrodynamic retarder. The secondary impeller 44 performs the function of a braking rotor. In order to realize these functions, appropriate devices that allow the assignment of these function in the stated manner must be provided. From a design perspective, the secondary impeller 44 must be able to be coupled torsionally-solidly to the mechanical transmission unit 42. The connection can alternatively be performed through two clutch devices, a first clutch device 46 and a second clutch device 47. The clutch device 46 allows the connection between the secondary impeller 44 and the mechanical transmission unit 42 over a hydraulic clutch 48. Clutch device 47 allows the mechanical connection between the secondary impeller 44 and the transmission unit 42 over a second hydraulic clutch 49. Both hydraulic clutch devices can each be coupled to the same transmission element of the mechanical transmission unit 42 or to different transmission elements of the mechanical transmission unit 42. The deciding factor for this is the construction or design of the transmission unit. It is for certain, however, that by appropriate activation of the clutch and brake devices in the mechanical transmission unit, a change in rotational direction of the transmission output shaft can achieve the realization of at least one reverse gear.

There are devices provided through which the primary impeller 43 is directly coupled to the transmission input shaft E across a part of the operating range in the first operating mode. The first device is a clutch device PK that is assigned to the primary impeller 43. Further, second devices are provided through which the transmission input shaft E can be coupled to the mechanical transmission unit 42 by bypassing the secondary impeller 42. The second device includes a clutch device in form of a bypass clutch UK. Furthermore, the transmission unit includes third devices, which during the second operating mode (referred to as "braking") locates and supports the primary impeller 43 against stationary transmission parts. This third device is designed the same way as a primary impeller clutch PB. The mechanical transmission unit 42 can be designed differently. For example, it is possible that the mechanical transmission unit 42 be designed analogous to the design outlined in FIG. 1. This is, however, not necessary. In particular, various combinations of planetary gear and spur gears can be utilized.

The design per FIG. 7a makes it possible that, during the "mechanical" part of the operation, both the primary impeller 43 and the secondary impeller 44 be disconnected from the transmission input shaft E or the mechanical transmission unit 42, respectively. Thus, no idle losses occur within the operating range.

FIG. 7b shows an overview of the transmission described by FIG. 7a and its operating modes. With reference to the attachment of the hydraulic transmission unit 41, this layout depicts a preferred transmission design.

The hydraulic transmission unit 41 operates during initial vehicle acceleration as a hydrodynamic coupling. Filling occurs during the individual gear steps and the operating mode "driving" preferably only during initial vehicle acceleration. In this case, the primary impeller clutch PK is activated and the bypass clutch UK between the transmission input shaft E and the mechanical transmission unit 42 is released. In this case, the secondary impeller is, through the clutch device 46, coupled to the mechanical transmission unit 42 via the hydraulic clutch 48.

Preferably, the blading of the impellers 43 and 44 is designed at a slant relative to the separation plane. The slant of the blading is laid out so that during initial vehicle acceleration the primary impeller and the secondary impeller are working in the "piercing" mode, which means that the torque moment is transmitted from the primary impeller 43 to the secondary impeller 44.

In the "mechanical" driving range, the hydrodynamic transmission component 41 is devoid of fluid, and the bypass clutch UK is activated and thus connects the transmission input shaft E to the mechanical transmission unit 42. The hydrodynamic unit 41 is, in this case, fully bypassed. This means that both the primary impeller 43 and the secondary impeller 44 do not rotate, and thus, no windage losses should be expected. The individual gear steps are realized through activation and de-activation of the individual hydraulic shift devices in the mechanical transmission unit 42.

The attainment of the reverse gear is accomplished by activation of the individual hydraulic shift devices of the mechanical transmission unit 42 and are realized mainly through the hydraulic "drive" unit, which is the hydraulic transmission unit 41. For this purpose, the primary impeller clutch is activated, and the second clutch device 47 is coupled to the mechanical transmission unit 42 through the hydraulic clutch 49. In the simplest case, a connection is realized between the secondary impeller 44 and a reversal shift unit through the hydraulic clutch 49 in the mechanical transmission unit 42. An appropriate activation of the individual hydraulic shift devices in the mechanical transmission unit 42, which allows a reversal in rotational direction of the transmission output shaft, is also possible.

For braking, there are two alternatives. The primary impeller 43 performs, in any case, the function of the stator wheel. Relative to the stationary transmission parts, the stator wheel solidly is supported. To achieve a change in the operating mode between power transmission and braking, according to this basic concept, there are, in essence, these potential possibilities. The secondary impeller 44 is driven either via the transmission output, that is, from the transmission output shaft at the same rotational direction, with a possible connection between the mechanical transmission unit 42 and the transmission shaft E, or from the transmission output, that is, the transmission output shaft. In the latter case, the connection between the secondary impeller and transmission input shaft is released, in reversed rotational direction relative to the rotational direction during initial acceleration, and performs the function of a hydrodynamic retarder. In this operating condition, the hydraulic transmission unit 41 is at least partially filled with operating fluid, which, due to the rotation of the secondary impeller, churns in the area between the primary and secondary impeller and is subsequently decelerated by the blading of the primary impeller 43. Devices are provided for locking and supporting the primary impeller 43 in a stationary fashion relative to the circular or non-moving transmission parts. In this case, that means the activation of the primary impeller clutch PB. For the realization of the first-mentioned alternative, which is not embodied in the control schematic, the hydrodynamic transmission unit 41 is filled with fluid for the generation of braking torque and the secondary impeller 44 remains coupled to the transmission output shaft via the selected gear. Due to the motoring condition on the part of the transmission output, the secondary impeller 44 is also motored with no change in the direction of rotation relative to the rotational direction that is observed during initial vehicle acceleration. In this case, the clutch device 46 can be activated.

The first-mentioned case, however, can only be realized if the blades of the two impellers are slanted. The slant of the individual blades relative to the blade root is selected such that in the first operating mode, especially during initial acceleration phase, the operating fluid, after having passed through the area between two neighboring blades of the primary impeller 43 (driven by the transmission input shaft), is then subsequently deflected on the backsides of the secondary impeller blades 44. This forms a closed fluid circuit between the primary and secondary impeller 43 and 44, respectively, and thus torque is transmitted. This working principle of the primary impeller relative to the secondary impeller is referred to as "piercing". Also, during the operating mode "braking", the hydrodynamic transmission unit 41 is filled with operating fluid. The selected gear is, in accordance to the first-mentioned alternative, retained in the mechanical transmission unit 42. The primary impeller 43 is locked and the secondary impeller 44 is driven in the same rotational direction via the vehicle, particularly the transmission output shaft A. Both impellers change their function. Now, the secondary impeller is the driven wheel and it rotates in the same direction as the primary impeller during the initial acceleration phase. The primary impeller 43 is locked and performs the function of a stator in a hydrodynamic retarder. Due to the slanted blading, only a part of the fluid energy in the toroid-shaped operating zone 45 that was generated as a result of the rotation of the secondary impeller 44 can be converted into braking power and consequently into thermal energy. The working principle of the secondary impeller 44 in this operating mode can be characterized as "running away" relative to the primary impeller 43 which is functioning as the stator wheel. This kind of realization of generating braking power through changes in functions of the two impellers, the primary and secondary impeller, can be done without additional expense or effort and can be achieved from the selected gear. However, since the generated braking moment is significantly lower than the moment generated by a "piercing" operating mode, attempts are made to permit a "piercing" operating mode between the primary impeller 43 and secondary impeller 44, both with slanted blade designs. In this case, the rotational direction of the secondary impeller 44 is reversed relative to the rotational direction observed during initial acceleration, as depicted in the shift diagram. The reversal occurs preferably through the engagement of the reverse gear. The powered secondary impeller 44 then converts the fed-in mechanical energy, with the fluid circuitry in filled condition, into fluid energy which is converted into thermal energy on the stationary impeller 43. This preferred alternative of changing the operating mode of the hydrodynamic transmission unit 41 offers the advantage that the rotating componentry operate across a very large speed range, which can be covered with a braking condition (mode) by changing the degree of filling. This is accomplished by gearing the primary impeller to increase its rotational speed and, in connection with the requirements imposed on the hydrodynamic unit, to offer significant transmission capability during initial acceleration. To achieve the reversal in rotational direction, the secondary impeller 44 is likewise coupled to the mechanical transmission unit 42 via the hydraulic clutch 49. Depending on the attachment to the transmission unit of the hydraulic clutch devices 49 and 48, it is also possible to activate the bypass coupling. This, however, is only possible in those cases in which the hydraulic clutch 48 in braking mode still turns in the same rotational direction as the transmission input shaft E. Otherwise, the bypass clutch is to be released.

The release of the bypass clutch takes place whenever both hydraulic clutch devices are connected to the same transmission component of the mechanical transmission unit 42. This means only one entry path into the mechanical transmission unit 42 is available. As already indicated, in this case, a reversal of the transmission output, transmission output shaft, or a reverse gear can be obtained either through a reversal stage or a suitable combination of activation of the clutch and brake devices (contained in the mechanical transmission unit 42). During the braking mode, the engagement of the reverse gear results, due to the motoring condition, in propulsion of the hydraulic clutch devices in opposite direction relative to forward-motion gears.

Relative to the individual braking stages used in the operating mode "braking", reference is made to the transmission configuration described in FIG. 1. It is possible here too, according to the design of the mechanical transmission unit 42, to obtain several braking stages.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A transmission assembly for drive units having an operating range and at least two operating modes, said at least two operating modes including a first operating mode for power transmission with at least two gears and a second operating mode for braking, said transmission assembly comprising:

a plurality of stationary transmission components;

a transmission input shaft;

a transmission output shaft;

a mechanical transmission unit connected to said transmission output shaft;

a hydraulic transmission unit connected in series with said mechanical transmission unit, said hydraulic transmission unit having at least two impellers, said at least two impellers including a primary impeller and a secondary impeller, said primary impeller and said secondary impeller being configured for being joined together and thereby defining a toroid-shaped operating zone, said operating zone being fillable with an operating fluid, each of said primary impeller and said secondary impeller being connected to each of said transmission input shaft and said mechanical transmission unit over at least a portion of the operating range such that power is transmitted from said primary impeller through said secondary impeller to said mechanical transmission unit; and a plurality of devices interconnecting said stationary transmission components and one of said primary impeller and said secondary impeller in said second operating mode, said devices also interconnecting said mechanical transmission unit and an other of said primary impeller and said secondary impeller in said second operating mode.

2. The transmission assembly of claim 1, wherein said one of said primary impeller and said secondary impeller comprises said primary impeller.

3. The transmission assembly of claim 2, wherein said secondary impeller is configured for coupling to said mechanical transmission unit in a torsionally-solid manner.

4. The transmission assembly of claim 3, further comprising a plurality of first devices configured for allowing said primary impeller to be coupled directly to said transmission input shaft over said portion of said operating range.

5. The transmission assembly of claim 4, further comprising a plurality of second devices configured for allowing said secondary impeller to be connected to said stationary transmission components during said second operating mode.

6. The transmission assembly of claim 5, further comprising a plurality of third devices configured for allowing said secondary impeller to be connected to said transmission input shaft.

7. The transmission assembly of claim 5, further comprising a plurality of third devices configured for allowing said transmission input shaft to be connected to said mechanical transmission unit by bypassing said secondary impeller.

8. The transmission assembly of claim 5, further comprising a separation plane between said primary impeller and said secondary impeller, each of said at least two impellers including blading, said blading being slanted relative to said separation plane.

9. The transmission assembly of claim 8, wherein said secondary impeller has a rotational direction during an initial vehicle acceleration in said second operating mode, said transmission assembly further comprising fourth devices configured for reversing said rotational direction of said secondary impeller.

10. The transmission assembly of claim 9, wherein said mechanical transmission unit includes at least one gear and at least one connectable reversal unit.

11. The transmission assembly of claim 10, wherein said fourth devices comprise hydraulic shift devices configured for being connected to said at least one connectable reversal unit.

12. The transmission assembly of claim 9, wherein said mechanical transmission unit includes a planetary gear arrangement.

13. The transmission assembly of claim 12, further comprising a plurality of individual transmission elements, said fourth devices comprising hydraulic shift devices grouped to said individual transmission elements.

14. The transmission assembly of claim 9, wherein at least one of said first devices, said second devices, said third devices and said fourth devices comprise hydraulic shift devices.

15. The transmission assembly of claim 14, wherein said hydraulic shift devices comprise at least one of clutch devices and braking devices, said hydraulic shift devices including at least two friction elements pressed against each other.

16. The transmission assembly of claim 9, wherein said first devices comprise a clutch device associated with said primary impeller.

17. The transmission assembly of claim 9, wherein said second devices comprise a clutch device.

18. The transmission assembly of claim 9, wherein said third devices comprise at least one braking device.

19. The transmission assembly of claim 18, further comprising a housing encasing each of said hydraulic transmission unit and said mechanical transmission circuit.

20. The transmission assembly of claim 19, wherein said housing supports said at least one braking device.

21. The transmission assembly of claim 9, wherein said fourth devices include clutch devices and braking devices.

22. The transmission assembly of claim 9, further comprising a first clutch device and a second clutch device, said first clutch device and said second clutch device being configured for clutching said secondary impeller to said mechanical transmission unit.

23. The transmission assembly of claim 1, wherein said one of said primary impeller and said secondary impeller comprises said secondary impeller.

24. The transmission assembly of claim 23, wherein said primary impeller is configured for being connected to said transmission input shaft in a torsionally-solid manner.

25. The transmission assembly of claim 24, further comprising first devices configured for connecting said transmission input shaft to said mechanical transmission unit.

26. The transmission assembly of claim 25, further comprising:

a connection between said transmission input shaft and said mechanical transmission unit; and second devices configured for coupling said secondary impeller to said connection between said transmission input shaft and said mechanical transmission unit.

27. The transmission assembly of claim 26, further comprising third devices configured for locking and supporting said secondary impeller against said stationary transmission parts during said second operating mode.

28. The transmission assembly of claim 27, further comprising a separation plane between said primary impeller and said secondary impeller, each of said at least two impellers including blading, said blading being slanted relative to said separation plane.

29. The transmission,assembly of claim 28, wherein at least one of said first devices, said second devices and said third devices comprise hydraulic shift devices.

30. The transmission assembly of claim 29, wherein said hydraulic shift devices comprise at least one of clutch devices and braking devices, said hydraulic shift devices including at least two friction elements pressed against each other.

31. The transmission assembly of claim 30, wherein said first devices comprise a clutch device disposed between said transmission input shaft and said mechanical transmission unit.

32. The transmission assembly of claim 31, wherein said second devices comprise a clutch device.

33. The transmission assembly of claim 32, wherein said third devices comprise at least one braking device associated with said secondary impeller.

34. The transmission assembly of claim 33, further comprising a housing encasing each of said hydraulic transmission unit and said mechanical transmission circuit.

35. The transmission assembly of claim 34, wherein said housing supports said at least one braking device.

36. The transmission assembly of claim 35, wherein said mechanical transmission unit includes at least one spur gear.

37. The transmission assembly of claim 36, wherein said mechanical transmission unit includes at least one planetary gear set having at least one ring gear, at least one sun gear, a plurality of planetary gears, and a carrier.

38. The transmission assembly of claim 37, wherein said mechanical transmission unit includes at least three planetary gear sets having a first planetary gear set, a second planetary gear set, and a third planetary gear set, said at least three planetary gear sets being mutually coupled.

39. The transmission assembly of claim 38, wherein said first planetary gear set includes a first transmission element, said second planetary gear set including a second transmission element connected to said first transmission element in a torsionally solid manner.

40. The transmission assembly of claim 39, wherein said third planetary gear set includes a first transmission element connected to said first transmission element of said first planetary gear set.

41. The transmission assembly of claim 39, wherein said third planetary gear set includes a first transmission element connected to said first transmission element of said first planetary gear set in a torsionally-solid manner.

42. The transmission assembly of claim 41, wherein said first planetary gear set includes a third transmission element configured for being connected to said secondary impeller by a first clutch device.

43. The transmission assembly of claim 42, wherein said first planetary gear set includes a second transmission element configured for being connected to said primary impeller by a second clutch device.

44. The transmission assembly of claim 43, wherein said first planetary gear set includes a second transmission element configured for being locked in place by a first brake device.

45. The transmission assembly of claim 44, wherein said third planetary gear set includes a third transmission element, said second planetary gear set including a third transmission element configured for being locked in place by a second brake device and said third transmission element of said third planetary gear set.

46. The transmission assembly of claim 45, wherein said third planetary gear set includes a second transmission element connected to said transmission output shaft in a torsionally-solid manner, said second transmission element of said third planetary gear set being connectable to said third transmission element of said third planetary gear set by a third clutch device.

47. The transmission assembly of claim 46, wherein said first transmission element of said first planetary gear set comprises said sun gear, said second transmission element of said first planetary gear set comprises said carrier, and said third transmission element of said first planetary gear set comprises said ring gear.

48. The transmission assembly of claim 46, wherein said first transmission element of said second planetary gear set comprises said sun gear, said second transmission element of said second planetary gear set comprises said ring gear, and said third transmission element of said second planetary gear set comprises said carrier.

49. The transmission assembly of claim 46, wherein said first transmission element of said third planetary gear set comprises said sun gear, said second transmission element of said third planetary gear set comprises said carrier, and said third transmission element of said third planetary gear set comprises said ring gear.

50. The transmission assembly of claim 1, further comprising a damper unit and a torque path having a direction, said damper unit being mounted in series with said hydraulic transmission unit in said direction of said torque path.

51. The transmission assembly of claim 50, wherein said damper unit is disk-shaped.

52. The transmission assembly of claim 51, wherein said damper device includes:
a diameter;
a plurality of torque support units disposed circumferentially on said diameter; and
a plurality of energy-absorbing elements disposed between said torque support units on said diameter, said energy-absorbing elements comprising springs.

53. The transmission assembly of claim 50, further comprising a primary impeller clutch, said primary impeller including an outer circumference, said damper device being disposed between said primary impeller clutch and said outer circumference of said primary impeller.

54. A method of transmitting power through a drive train between a power source and a power-absorbing device, said method comprising the steps of:
integrating a transmission assembly into the drive train, said transmission assembly having at least two operating modes, said at least two operating modes including a driving operating mode and a braking operating mode, said transmission assembly including:
a transmission input shaft;
a transmission output shaft;
a mechanical transmission unit; and
a hydraulic transmission unit having at least two impellers, said at least two impellers including a primary impeller and a secondary impeller;
providing at least two gears in said driving operating mode, said at least two gears including a first acceleration gear and a second gear;
linking said hydraulic transmission unit in series with said mechanical transmission unit in said first acceleration gear;
connecting said mechanical transmission unit to said transmission input shaft in said second gear;
operating said hydraulic transmission unit as a hydrodynamic coupling at least during initial vehicle acceleration of said driving mode, said operating step including the substeps of:
coupling said primary impeller to said transmission input shaft in a torsionally-solid manner; and
interconnecting said secondary impeller and said transmission output shaft with said mechanical transmission unit; and
implementing said braking mode hydraulically by operating said hydraulic transmission unit as a hydraulic retarder, said implementing step including the substeps of:
holding one of said primary impeller and said secondary impeller substantially stationary; and
driving an other of said primary impeller and said secondary impeller with said transmission output shaft.

55. The method of claim 54, comprising the further steps of:
providing said hydraulic transmission unit with an operating zone; and completely emptying said operating zone during said second gear of said driving operating mode.

56. The method of claim 55, comprising the further step of mechanically connecting said primary impeller to said secondary impeller starting with a point in time at which said operating zone is emptied.

57. The method of claim 56, comprising the further step of mechanically connecting one of said primary impeller and said secondary impeller to said transmission input shaft starting with said point in time at which said operating zone is emptied.

58. The method of claim 57, comprising the further steps of:

providing a separation plane between said primary impeller and said secondary impeller; and providing said primary impeller and said secondary impeller with blading, said blading being slanted relative to said separation plane such that said primary impeller and said secondary impeller operate in a piercing mode at least with said hydraulic transmission unit being partially filled and with said primary impeller being connected to said transmission input shaft.

59. The method of claim 58, comprising the further step of driving said secondary impeller in a run-away fashion at a constant direction of rotation relative to said blading of said primary impeller, said driving step comprising the substeps of:

locking said primary impeller; and at least partially filling said operating zone of said hydraulic transmission unit.

60. The method of claim 57, comprising the further steps of:

providing a separation plane between said primary impeller and said secondary impeller; and providing said primary impeller and said secondary impeller with blading, said blading being slanted relative to said separation plane such that said primary impeller is driven in a piercing manner relative to said secondary impeller at least with said hydraulic transmission unit being partially filled and with said primary impeller being connected to said transmission input shaft.

61. The method of claim 60, comprising the further step of driving said secondary impeller in a piercing manner relative to said blading of said primary impeller, said driving step comprising the substeps of:

locking said primary impeller;

partially filling said operating zone of said hydraulic transmission unit; and activating a reverse gear.

62. The method of claim 57, comprising the further steps of:

providing a separation plane between said primary impeller and said secondary impeller; and providing said primary impeller and said secondary impeller with blading, said blading being slanted relative to said separation plane such that each of said primary impeller and said secondary impeller are driven in a piercing manner at least with said hydraulic transmission unit being partially filled and with said primary impeller being connected to said transmission input shaft.

63. The method of claim 62, comprising the further step of driving said primary impeller in a piercing manner at a constant direction of rotation relative to said blading of said secondary impeller, said driving step comprising the substeps of:

locking said secondary impeller; and at least partially filling said operating zone of said hydraulic transmission unit.

64. A hydrodynamic unit for installation into a drive train between a drive shaft and a to-be-driven shaft, said hydrodynamic unit comprising:

at least two impellers, said at least two impellers including a primary impeller and a secondary impeller defining a toroid-shaped operating zone therebetween, at least one of said primary impeller and said secondary impeller having a connection to said drive shaft, said at least one of said primary impeller and said secondary impeller having at least one hydraulic shift device configured for selectively coupling and decoupling said connection to said drive shaft;

a housing encasing each of said primary impeller and said secondary impeller; and at least one device attachable to said housing, said at least one device configured for locking and supporting said at least one of said primary impeller and said secondary impeller.

65. The hydrodynamic unit of claim 64, further comprising a separation plane disposed between said primary impeller and said secondary impeller, each of said primary impeller and said secondary impeller including blading, said blading being slanted relative to said separation plane.

* * * * *